Patented May 13, 1941

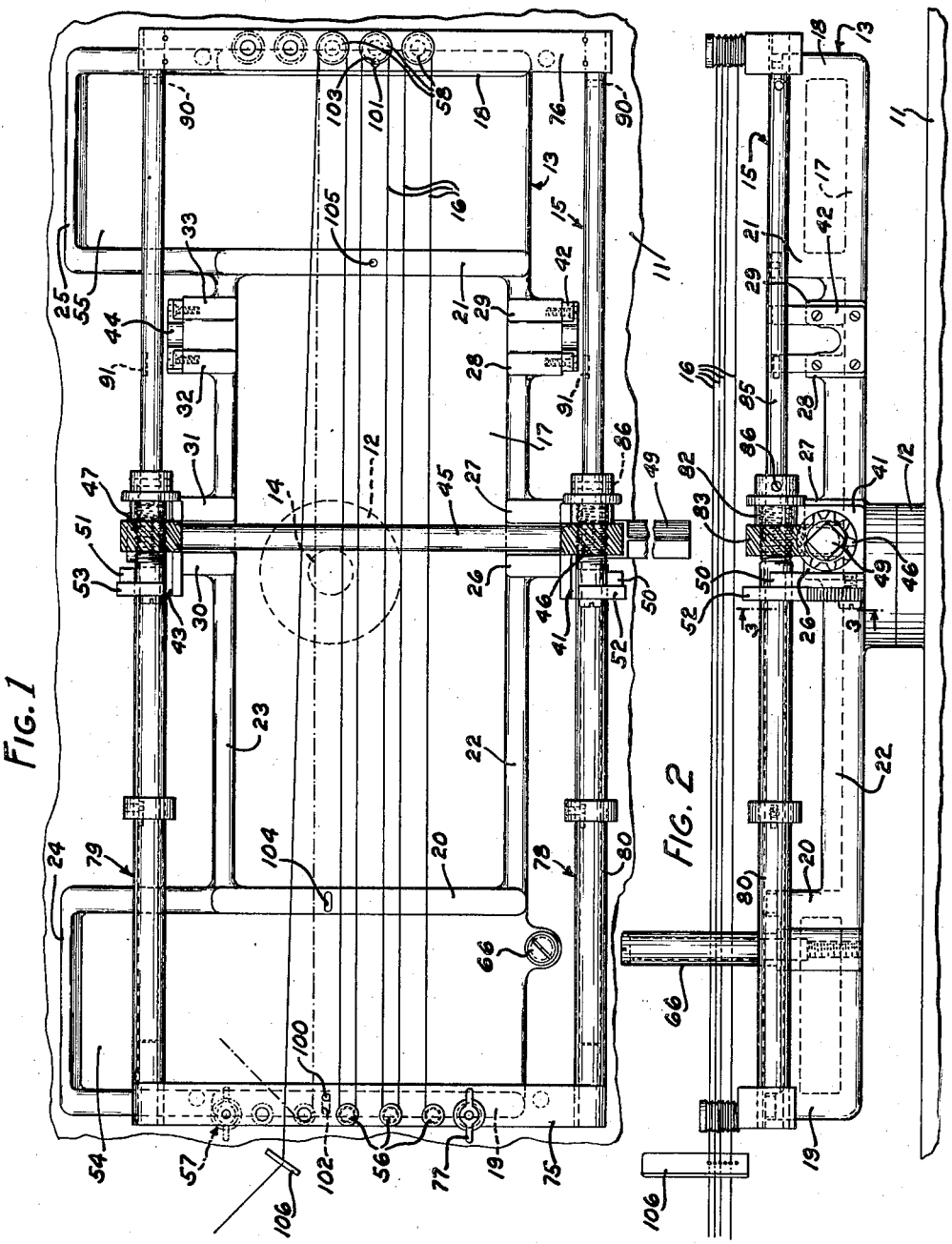

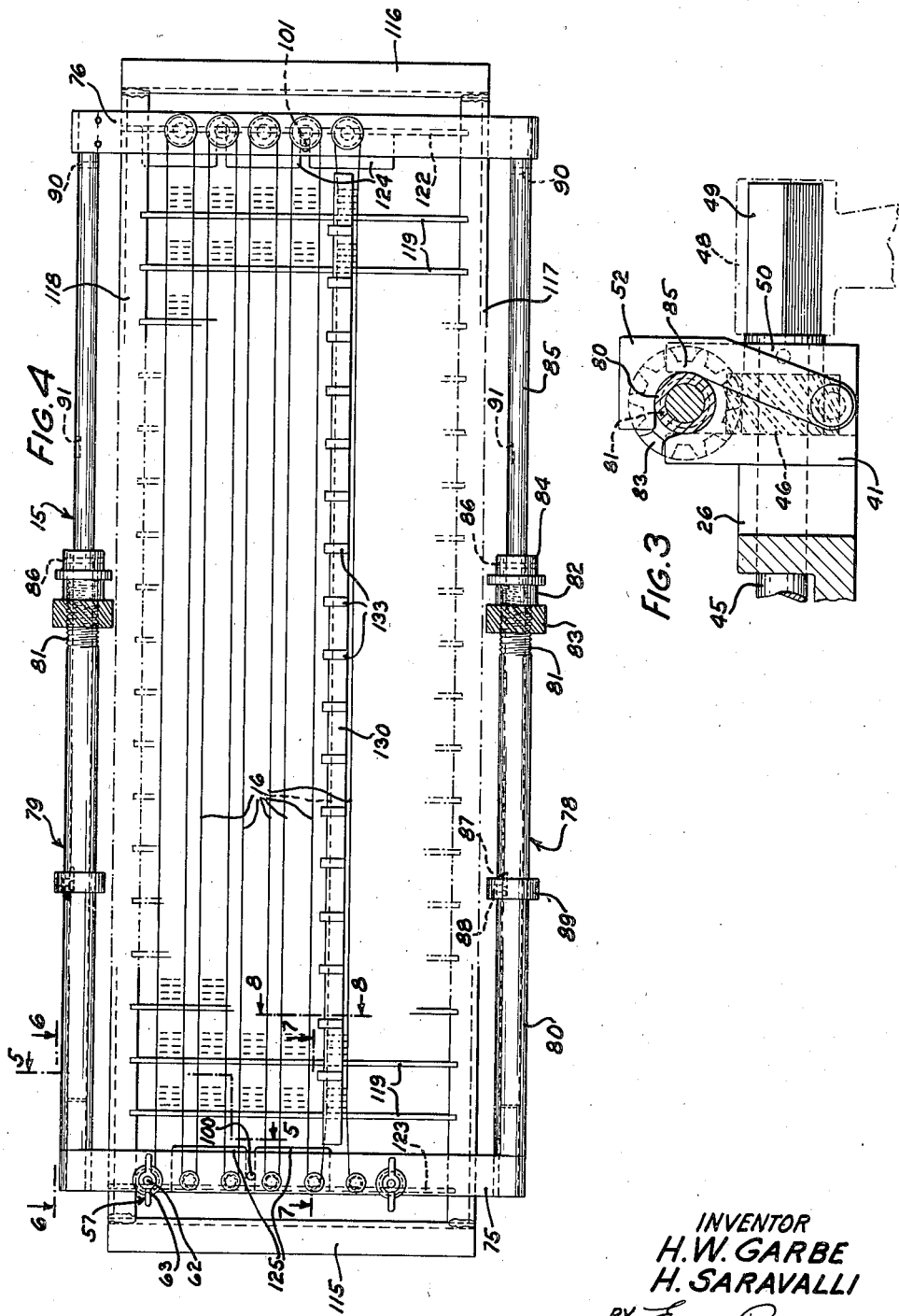

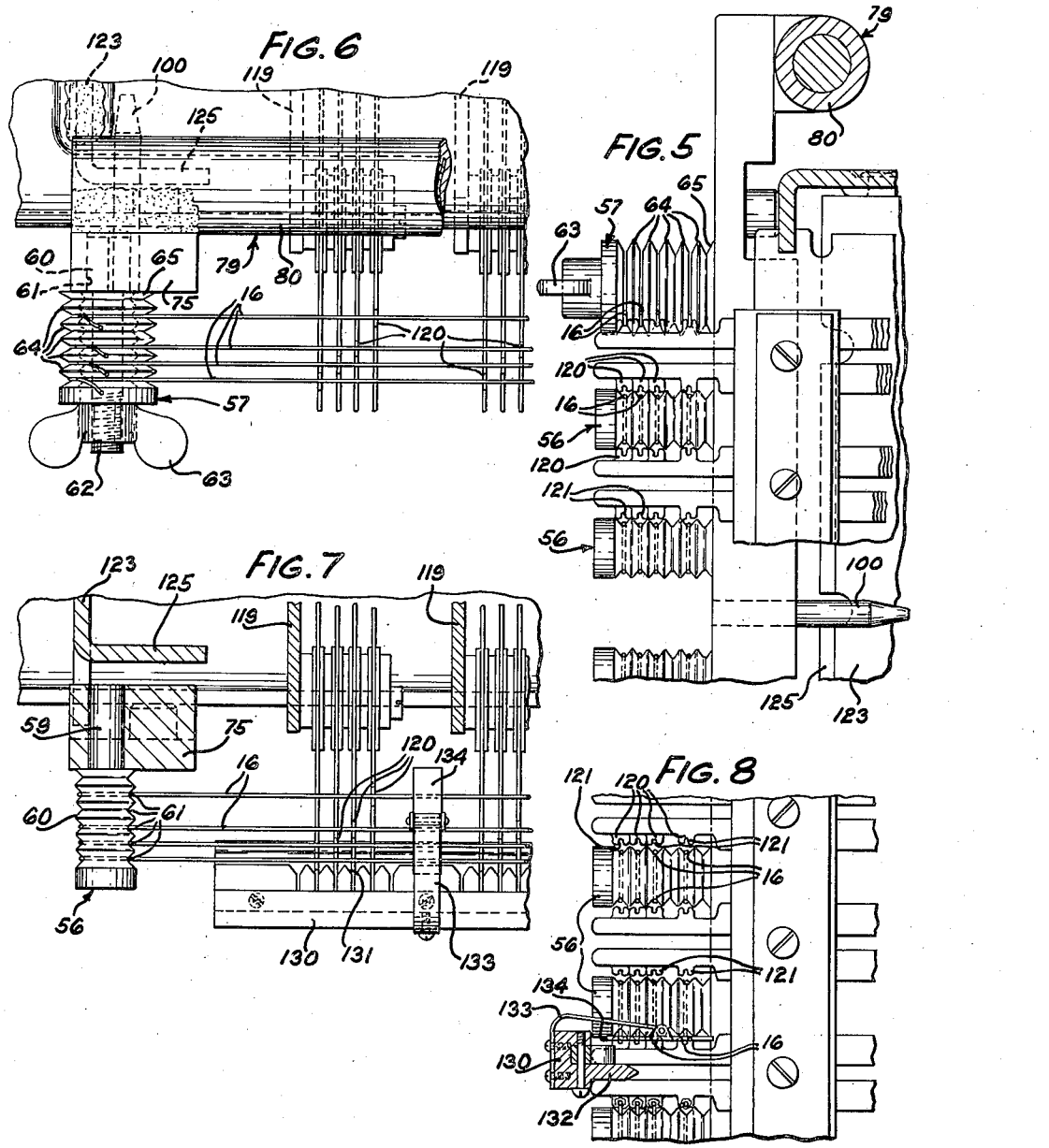

2,241,880

UNITED STATES PATENT OFFICE 2,241,880

METHOD OF AND APPARATUS FOR WIRING ELECTRICAL UNITS

Howard W. Garbe, Hinsdale, and Herman Saravalli, Chicago, Ill., assignors to Western Electric Company, Incorporated, New York, N. Y., a corporation of New York Application January 11, 1940, Serial No. 313,404

15 Claims. (Cl. 140—71)

This invention relates to a method of and apparatus for wiring electrical units and more particularly to a method of wiring cross bar switch units and apparatus for positioning the wires during the attachment thereof to the cross bar switch units.

It is an object of the present invention to simplify and expedite the wiring of electrical apparatus.

In accordance with one embodiment of the invention, the method as applied to the wiring of cross bar switch units, which have a plurality of rows of terminals extending from their terminal end and designed to be strapped together by rows of wires fixed to them, for example, by soldering, utilizes an expansible frame into which a series of removable pins may be inserted progressively as a frame support is oscillated through 180° to feed a plurality of wires simultaneously to the pins on the frame. After the wires have been wound on the expansible frame, it being understood that the leading ends of the wires have been fixed to the frame before the wires are wound about the pins and that the trailing ends of the wires are fixed to the frame after the wires have been wound relatively loosely upon the pins, the frame may be expanded by rotating a shaft positioned in the support on which the frame is mounted during the winding of the wires. The frame is provided with a pair of gears which mesh with corresponding gears on the shaft when the frame is positioned on its support whereby rotation of the shaft will impart rotation to screw threaded members forming parts of the frame to expand the frame and tighten the wires on the pins. After the frame has thus been supplied with wires and the wires have been tightened, it may be removed from the support and hung upon a cross bar switch unit with the wires in position adjacent the terminals. A suitable fixture is provided for forcing the wires down into intimate engagement with the terminals during the soldering operation. This fixture is described in detail and claimed in our copending application Serial No. 313,403, filed January 11, 1940. After the wires have been soldered to the terminals, the ends thereof adjacent the pins on the expansible frame may be clipped off and the expansible frame again positioned on the support to receive a new set of wires.

A better understanding of the invention will be had from the following detailed description when considered in conjuction with the accompanying drawings, wherein Fig. 1 is a plan view of an expansible frame positioned upon an oscillatable support or turntable and showing the expansible frame partly wired;

Fig. 2 is a front elevational view of the structure shown in Fig. 1;

Fig. 3 is a fragmentary vertical sectional view taken on the line 3—3 of Fig. 2 in the direction of the arrows showing the details of the mechanism for expanding the expansible frame;

Fig. 4 is an elevational view showing the rear or terminal end of a cross bar switch assembly with the expansible frame suspended thereon and showing the fixture for holding the wires in contact with the terminals in elevation; and Figs. 5, 6, 7 and 8 are fragmentary sectional views taken on the lines 5—5, 6—6, 7—7 and 8—8, respectively, (Fig. 4) in the direction of the arrows showing, on an enlarged scale, some details of the expansible frame and the fixture for holding the wires in contact with their associated terminals and also showing the method of mounting the expansible frame on the cross bar switch assembly.

Referring to the drawings, wherein like reference characters designate the same parts throughout the several views, there is shown, in Figs, 1 and 2, a support 11, which may be a work bench or other suitable support, having extending upwardly therefrom (Fig. 2) a boss 12, which serves as a bearing for pivotally supporting a turntable 13, which is oscillatable about a pivot pin 14 mounted centrally of the boss 12. The turntable 13 constitutes a support upon which an expansible frame, designated generally by the numeral 15, may be positioned during the stringing of a plurality of wires 16—16 on the frame. The turntable 13 comprises a base portion 17, end walls 18 and 19, intermediate walls 20 and 21, main front and rear walls 22 and 23 and rear wall portions 24 and 25. The main front and rear walls 22 and 23 are relatively low and have extending upwardly therefrom projections 26, 27, 28, 29, 30, 31, 32 and 33. The projections 26 and 27 cooperate to support a bearing 41, projections 28 and 29 serve to support a bearing 42, projections 30 and 31 serve to support a bearing 43 and projections 32 and 33 serve to support a bearing 44. The bearings 41 and 43 are of substantially the same construction and the bearings 42 and 44 are of the same construction. A shaft 45 may be journalled in either the bearings 41 and 43 or in the bearings 42 and 44 and carries adjacent its ends helical gears 46 and 47. The forward end of the shaft 45 has a rectangular portion 49 which extends out beyond the bearing 41 or 42, depending upon which set of bearings the shaft 45 is mounted in and is adapted to receive a crank handle 48 shown in dot and dash lines in Fig. 3, whereby the shaft may be rotated. The bearings 41 and 43 have formed integrally with them projections 50 and 51, respectively, which serve as bearings for supporting portions of the expansible frame 15, as will be described hereinafter, pivoted locking members 52 and 53 being mounted on projections 50 and 51 for locking said portion of the expansible frame 15 into the projections 50 and 51, respectively.

The base portion 17 of the turn table 13 enclosed between the walls 19, 20 and 24 slopes downwardly from front to rear, as viewed in Fig. 1, and forms a pocket 54 and similarly the base portion 17 is enclosed by the walls 18, 21 and 25 and slopes downwardly from front to rear to form a pocket 55. When an expansible frame 15 is being wound with wires 16, a number of relatively small pins 56 and a clamping pin 57 may be placed in the pocket 54 to facilitate the handling of the pins in a manner to be described. In a similar manner, a number of relatively large pins 58 may be positioned in the pocket 55. One of the pins 56 is shown in detail in Fig. 7 and comprises a shank portion 59 and a relatively long head portion 60, the head portion being provided with a series of grooves 61 in which wires 16 may be positioned. It will be understood that the pins 56 and the pins 58 are of substantially the same construction except that the pins 58 are somewhat larger in the diameter of their head portions to effect a proper spacing of the wires 16 on the expansible frame 15. The clamping pin 57 is shown in some detail in Figs. 5 and 7 and comprises a square shank 60 which fits tightly into a square hole 61 in the expansible frame 15. The outwardly extending portion of the clamping pin 57 is threaded, as shown at 62, for receiving a clamping nut 63 adapted to compress a series of washer-like members 64 against a shoulder 65 formed integrally with the shank of the pin to clamp the series of wires 16 between the washer-like members 64. The turntable 13 is provided with a handle 66, which extends upwardly from the front edge of the pocket 54, whereby the turntable may be oscillated during the winding of wires 16 on the expansible frame 15.

The expansible frame comprises end members 75 and 76 into which the pins 56, 57 and 58 may be easily inserted and from which they also may be easily removed. The end member 75 carries a clamping assembly 77, which is of substantially the same construction as the clamping pin assembly 57, except that the shank of the pin in the assembly 77 is fixed in the end member 75. The end members 75 and 76 of the expansible frame 15 are interconnected by telescoping assemblies 78 and 79, which are identical in construction, and only one of which need be described.

The telescoping assembly 78 comprises a tubular member 80, which may be seen most clearly in Fig. 4, since in that figure the expansible frame 15 is shown removed from the turn table 13. The tubular member 80 extends to the outer end of the end member 75 and is suitably secured thereto, for example, by welding the two members together. The right end (Fig. 4) of the tubular member 80 is threaded externally, as shown at 81, and has threaded on it a collar 82, on which there is formed a helical gear 83, which meshes with the gear 46. The collar 82 abuts a collar 84, which is secured to a rod 85 by means of a pin 86. The rod 85 extends an appreciable distance into the tubular member 80 and it will be apparent that if the collar 82 is rotated by means of the gear 83 in the proper direction, the collar 82 will thrust against the collar 84 and tend to move the rod 85 out of the tubular member 80. In order to prevent the rod 85 from coming out of the tubular member 80, when there are no wires on the expansible frame 15, the rod 85 is provided with a slot 87 adapted to receive the extending end of a screw 88 threaded through a collar 89 fixed to the tubular member 80. The telescoping assembly 78 and 79, as shown, are arranged to hold the expansible frame 15 in a position to receive wires 16 for a relatively large cross bar switch assembly. However, if it is desired to utilize the expansible frame 15 in wiring small units, the frame may be collapsed and the collar 84 moved from the position shown to a position where the pin 86 will pass through an aperture 90 in the rod 85 and the screw 88 will engage a second slot 91 formed in the rod 85.

The expansible frame 15, when expanded to the position as shown in the drawings, may be mounted upon the turntable 13 by a pair of positioning pins 100 and 101, which extend into a slot 102 and a hole 103, respectively, in the end walls 19 and 18, respectively. However, when it is desired to arrange wire 16 for a smaller cross bar switch assembly, the expansible frame 15 may be collapsed as described hereinbefore and the pins 100 and 101 will then fit into a slot 104 and a hole 105 in the intermediate walls 20 and 21, respectively, it being understood that the shaft 45 will then be mounted in the bearings 42 and 44, the pivoted locking members 52 and 53 being used to clamp the telescoping assemblies 78 and 79 in position during the winding of the wire 16 on the expansible frame 15.

The method of stringing the wires 16 on the frame 15 comprises placing an expansible frame 15 on the turntable 13 and if it is assumed that a large cross bar switch assembly is to be wired, the frame 15 will be extended to the size shown in the drawings and placed on the turn table with the pin 101 in the hole 103 and the pin 100 in the slot 102, the shaft 45 being positioned as shown. As soon as the frame 15 has been placed in position on the turntable, the shaft 45 may be rotated in a counter-clockwise direction, by means of the crank handle 48, to thread the collar 82 onto the tubular member 80 a sufficient distance so that the pin 100 will engage the right hand end of the slot 102 (Fig. 1), whereupon, after removing the crank handle 48 from shaft 45, a plurality of wires 16, which have been threaded through a hand guide 106 from a suitable group of supply rolls (not shown) but being suitably tensioned to place a slight drag on the wires 16 may be drawn from them, may be positioned on the pins 56 and 58. The forward end of the wire 16 may be fixed to the clamping assembly 77 and a pin 56 placed in position in the lowermost hole in the end members 75, whereupon the turntable 13 may be oscillated in a counter-clockwise direction to bend the wires 16 around the lowermost pin 56 and the wires will be aligned in the proper grooves on the pin 56 by means of the hand guide 106. As the turn table 13 is oscillated in a counter-clockwise direction, wire will be withdrawn from the supply under tension and may then be guided onto the lowermost pin 56 on the end member 76, the pin 58 having been inserted in the end member 76 after the turntable has been oscillated 180° from the position shown. The turntable 13 may then be oscillated back to the position shown, a new pin 56 inserted in the second hole from the bottom in the end member 75, and the table again oscillated. This operation may be continued until the desired number of rows of wires 16 have been wound upon the pins 56 and 58. After a sufficient number of layers of wire have thus been wound on the frame, the clamping pin assembly 57 may be inserted in the last hole on the end member 75 and the wires 16 clamped to it. The wires will now be strung about the pins 56 and 58, but will be somewhat loose thereon and may be tightened to take any play out of the wire by expanding the frame 15. This may be done by rotating the shaft 45 in a clockwise direction to move the collar 82 to the right (Figs. 1, 2 and 4), thereby to tend to move the rod 85 out of the tubular member 80. In this manner, the wires will be strung tightly about the pins 25 and the expansible frame 15 may then be removed from the turntable 13 and positioned on a cross bar switch assembly, as will now be described.

The cross bar switch assembly, which, of itself, does not constitute a part of this invention, comprises a framework composed of end members 115 and 116 (Fig. 4) to which there are secured horizontal frame members 117 and 118 to form a substantially rectangular frame on which a series of vertical unit supports 119 are fixed. The vertical unit supports 119 have mounted upon them a series of banks of contacts, the terminal ends of which are shown in Figs. 4 to 8, inclusive. In wiring these switches for use in telephone apparatus, the various terminals in each group are strapped to corresponding terminals in all the other groups in the same level with them and therefore the extending ends of the apparatus are provided with soldering lugs 120, which project from the terminal ends of the springs and have U-shaped notches 121 in them to receive the strap wires 16.

The framework of the cross bar switch assembly has, adjacent each end, plates 122 and 123 which support part of the apparatus in the unit. These plates 122 and 123 have bent-over portions as indicated at 124 and 125, respectively, between which the pins 101 and 100, respectively, may be inserted to support the expansible frame 15 on the cross bar switch assembly and hold the wires 16 in position directly above the notches 121 in the soldering lugs 120. In this manner, the wires 16 will be positioned directly above the notches 121 in the soldering lugs 120, as shown in Fig. 5, and in the upper portion of Fig. 8. As soon as the operator has the expansible frame 15 mounted on the cross bar switch assembly in the manner just described, any suitable key or block of material may be inserted between the rows of wires 16 and turned to force the wires down into the notches 121 in the soldering lugs 120. After the wires have been moved into the notches in the soldering lugs, there may be some tendency for the wires at the middle of the cross bar switch assembly to move upwardly away from their respective contacts, and, accordingly, there has been provided a hold down fixture, which comprises a bar 130 long enough to extend across all of the contacts of the cross bar apparatus and having a series of grooves 131 cut therein to receive the terminal ends of the contact springs of the cross bar apparatus. The bar 130 has fixed thereto a pointed guide 132 adapted to fit between adjacent rows of terminals and accurately position the bar 130 with respect to the terminals. Fixed to the bar 130 is a spring 133 having attached to its free end a hold down plate 134, which will bear upon the wires 16 and hold them in the notches 121 during the soldering operation. After the first, third, fifth, seventh and ninth rows of wires, counting from the top (Fig. 4), have been soldered to their respective terminals, the entire cross bar switch assembly may be inverted without removing the expansible frame 15 from it and the soldering operation repeated on the second, fourth, sixth, eighth and tenth rows of wire, as viewed in Fig. 4, which will be uppermost when the assembly is reversed. After all of the terminals have been soldered to the strap wires 16, the extending ends of the wires adjacent the pins 56 and 58 may be cut and the expansible frame 15 removed and again positioned upon the turntable 13 to receive another set of wires for connection to another piece of cross bar switch apparatus. The hold down fixture for holding the wires in the notches 121 of the soldering lugs 120 is utilized in practicing the method of the present invention, but since it may be useful in many other operations, it forms the subject matter of a separate application being filed concurrently herewith, which application bears Serial No. 313,403 and filing date of January 11, 1940.

Although the method covered by the present invention has been described in connection with a specific apparatus and the apparatus has been described specifically, it will be understood that other apparatus may be used in practicing the method and modifications may be made in the apparatus without departing from the scope of the invention, which is to be limited only by the appended claims.

What is claimed is:

1. A method of wiring electrical apparatus having a plurality of rows of terminals to be strapped together which comprises wiring a plurality of strands of wire on an open expansible framework, fixing the ends of the wires so wound to the framework, expanding the framework to tighten the wires thereon, suspending the framework on a piece of apparatus to be wired, and soldering the wires to the terminals of the apparatus.

2. A method of wiring electrical apparatus comprising winding strands of wire on an expansible framework, expanding the framework after the wire has been wound thereon, temporarily mounting the expansible frame on the apparatus to be wired, forcing the wires into initimate engagement with their associated contacts, soldering the wires to their contacts, and then clipping the wires from the frame.

3. A method of wiring electrical apparatus which comprises placing an expansible framework on a turntable, oscillating the turntable to feed wires onto the expansible framework, fixing the ends of the wires to the framework, expanding the framework to straighten the wires, supporting the framework on apparatus to be wired, forcing the wires into engagement with the terminals of the apparatus, soldering the wires to the terminals of the apparatus, and cutting the wires from the framework.

4. A method of wiring electrical apparatus which comprises mounting an expansible framework on a turntable, fixing the ends of a plurality of wires to the expansible framework, oscillating the turntable with the framework thereon through an angle of 180° to feed wires to the framework, fixing the free ends of the wires to the framework, expanding the framework to put the wires under tension thereon, mounting the framework on apparatus to be wired, soldering the wires to the terminals of the apparatus, and cutting the wires from the framework.

5. A method of attaching strap wires to cross bar units which comprises placing an expansible framework on an oscillatable turntable, securing the ends of the wires to said framework, oscillating the turntable through 180° to draw wires from a supply thereof, placing a pin in the framework and oscillating it in a reverse direction to withdraw more wire from the supply, placing a second pin in the framework and repeating the oscillating movement and insertion of pins until the desired number of layers of wire have been wound on the framework, fixing the ends of the wires to the framework, expanding the framework to tighten the wires on the pins, mounting the framework on a cross bar switch assembly with the wires in alignment with the terminals thereof, pressing the wires down into intimate engagement with the terminals, soldering the wires to the terminals, and cutting the wires adjacent the expansible frame.

6. In an apparatus for positioning wires during the attaching thereof to electrical equipment, a turntable, a shaft mounted in said turntable and carrying a pair of gears, an expansible framework removably positionable on said turntable and comprising telescoping members, gears threaded on said members and adapted to engage the gears mounted on said shaft whereby the framework may be expanded.

7. In an apparatus for positioning wires during the attaching thereof to electrical equipment, a turntable, a shaft mounted in said turntable and carrying a pair of gears, an expansible framework removably positionable on said turntable and comprising pairs of telescoping members, gears threaded on one member of each pair of telescoping members for engagement with the gears on said shaft when the framework is positioned on said turn table and wire receiving pins positionable in said framework.

8. In an apparatus for positioning wires during the attachment thereof to electrical equipment, an expansible wire holding framework, means for supporting the expansible framework during the wiring thereof, and cooperating means on the framework and the supporting means for expanding the framework.

9. In an apparatus for positioning wires during the attachment thereof to electrical equipment, an expansible wire holding framework, means for supporting the expansible framework during the wiring thereof, and cooperating means on the framework and the supporting means for expanding the framework, said means comprising gears on the framework and on the supporting means.

10. In an apparatus for positioning wires during the attachment thereof to electrical equipment, an expansible wire holding framework, means for supporting the expansible framework during the wiring thereof, and cooperating means on the framework and the supporting means for expanding the framework, said means comprising gears threaded on the framework, gears carried by the supporting means, and a manually actuatable shaft journalled in the supporting means and carrying the gears in the supporting means.

11. An apparatus for positioning wires during the attachment thereof to electrical equipment, an expansible framework comprising two assemblies, means for connecting said assemblies in a plurality of positions with respect one to another, and means for expanding said framework by adjusting the position of said assemblies with respect to each other in any of the plurality of positions.

12. An apparatus for positioning wires during the attachment thereof to electrical equipment, an expansible framework comprising two assemblies, means for connecting said assemblies in a plurality of positions with respect one to another, and means for expanding said framework by adjusting the position of said assemblies with respect to each other in any of the plurality of positions, comprising a pair of gears threaded on the ends of one of said assemblies and a pair of adjustable collars on the ends of the other assembly.

13. An apparatus for positioning wires during the attachment thereof to electrical equipment, an expansible framework comprising two assemblies, means for connecting said assemblies in a plurality of positions with respect one to another, means for expanding said framework by adjusting the position of said assemblies with respect to each other in any of the plurality of positions, comprising a pair of gears threaded on the ends of one of said assemblies and a pair of adjustable collars on the ends of the other assembly, and means for supporting said expansible framework during the expanding thereof comprising a turntable, a shaft positionable in a plurality of bearings on said turntable, and a pair of gears carried by said shaft for cooperation with the gears on the expansible framework.

14. In an apparatus for positioning wires during the attaching thereof to electrical equipment, a turntable, a shaft mounted in said turntable and carrying a gear, an expansible framework removably positionable on said turntable and comprising telescoping members, and a gear threaded on one of the telescoping members for engagement with the gear on said shaft when the framework is positioned on said turntable.

15. In an apparatus for positioning wires during the attaching thereof to electrical equipment, oscillatable supporting means, a framework positionable on said supporting means for receiving wires during the oscillation of the supporting means, and means on the framework for putting the wires thereon under tension.

HOWARD W. GARBE.
HERMAN SARAVALLI.